Patented June 18, 1935

2,005,412

UNITED STATES PATENT OFFICE 2,005,412

PLATINUM CONTACT MASS CONTAINING PROMOTER AND METHOD OF MAKING SAME

Gerald C. Connolly and Jeremiah A. Pierce, Baltimore, Md., assignors, by mesne assignments, to Chester F. Hockley, as receiver for The Silica Gel Corporation, Baltimore, Md., a corporation of Maryland No Drawing. Application February 7, 1931, Serial No. 514,317

10 Claims. (Cl. 23—175)

The present invention relates to platinum contact masses, and methods of making same.

Platinum contact masses as heretofore proposed usually consist of a support or a porous carrier having the platinum associated therewith. Such masses are particularly suited for catalytic processes, as for example, the contact process for making sulphuric acid. Although such masses give satisfactory results it has been found that the desirable characteristics will be enhanced if a promoter substance is present. By the term "promoter substance" is meant any material which, when associated with the platinum contact mass, acts to increase the percentage conversion, the range of temperature over which a high conversion is obtained or lower the temperature at which a high conversion is secured. It may consist of a substance which exhibits little or no catalytic properties but is capable of promoting, activating, or accelerating the catalytic action of the platinum contact mass when present therein or a substance which possesses catalytic properties and when associated with the platinum contact mass acts as a co-catalyst.

The promoter substance employed may be a compound of iron, nickel, aluminum, copper, bismuth, molybdenum, berryllium, vanadium, tin, chromium manganese, or a mixture of compounds of said metals, as for instance, an oxide or a salt of said metals or mixtures thereof. Of these metal compounds those of manganese are preferred.

The quantity of promoter substance present in the contact mass is variable. It is dependent upon the particular compound or compounds of metals employed for this purpose, and the method whereby the platinum contact mass containing the promoter substance is made. In some cases, the amount of promoter substance present in the contact mass may run as high as 5% by weight of the mass while in others it may be as low as about 1% or slightly less, by weight of the mass. In still other cases, a trace of the promoter substance is sufficient.

The term "carrier or support" as used herein is intended to cover the carrier or support in their intermediate stage of manufacture as well as their final forms.

The carrier may consist of a material containing one or more hydrous oxide gels. The term "hydrous oxide gels" as used herein is intended to include both hydrogels and/or gelatinous precipitates, or mixtures of the two, partially dehydrated or not, of one or more oxides such as silica, germania, chromia, tungstia, titania, alumina, stannia, and the like. The carrier may also consist of other porous materials such as kieselguhr, porous clays, base-exchange compounds, gel fines of any kind, etc.

The method according to the present invention may be carried out in a number of specific ways. One method consists in treating a carrier with a solution of a promoter substance of such concentration and for a sufficient time to charge it with the desired amount of promoter, then treating the carrier with a solution of a platinum compound of such concentration and for a sufficient time to impregnate the carrier, and finally treating the carrier so as to convert the platinum compound into the metal platinum. In place of treating the carrier successively with a solution of a promoter substance and a platinum compound, the carrier may be impregnated simultaneously with the promoter substance and platinum compound by treating the carrier with a solution containing both of said materials.

Another method whereby it is possible to produce the platinum contact masses according to the present invention comprises charging a porous carrier with a reacting gas such as hydrogen, hydrogen sulphide, carbon monoxide, arsine, phosphine, stibine, water gas, formaldehyde, sulphur dioxide, preferably hydrogen sulphide, treating the charged carrier with a solution containing both the platinum compound and the promoter substance or successively treating the charged carrier with a solution of the platinum compound and the promoter substance, and finally treating the impregnated carrier so as to convert the platinum compound into the metal platinum. If desired, the porous carrier may be first impregnated with a platinum compound and a promoter substance as by treating the carrier either with a solution of a platinum compound and of a promoter substance successively in any order or with a solution containing both the platinum compound and promoter substance, then contacted with a reacting gas, and finally treated so as to convert the platinum compound contained in the carrier into the metal platinum.

Where the carrier is treated in an intermediate stage of manufacture as when it includes a non-dehydrated hydrous oxide gel, the promoter substance may be incorporated in the hydrous oxide gel by introducing the said substance either into the reaction mass capable of forming the non-dehydrated hydrous oxide gel prior to its conversion into the hydrogel and/or gelatinous precipitate or mixing it with one of the ingredients employed in forming the reaction mass. The porous carrier including the non-dehydrated hydrous oxide gel having the promoter substance disseminated therethrough may be either treated with a solution of a platinum compound to charge the gel with the desired amount of such compound, dried to convert the gel into a hard, porous material, and finally treated so as to convert the platinum compound into the metal platinum; or dried so as to convert the gel into a hard, porous material, then treated with a solution of the platinum compound, and finally treated so as to convert the platinum compound into the metal platinum.

If the promoter substance used is a metal oxide such as alumina, stannia, such metal oxides may be incorporated in the carrier including a non-dehydrated hydrous oxide gel in the form of a non-dehydrated hydrous alumina or stannia gel by adding the alumina or stannia gel to the non-dehydrated hydrous oxide gel of the carrier in the desired amount, and triturating to effect a thorough mixture. The carrier containing the mixed non-dehydrated gels may be either treated with a solution of a platinum compound, dried so as to convert the gels into a hard, porous material, and finally treated so as to convert the platinum compound into the metal platinum; or dried so as to convert the gels into a hard, porous material, treated with a solution of the platinum compound, and finally treated so as to convert the platinum compound into the metal platinum.

Still another method comprises treating a carrier including a non-dehydrated gel with a solution of a promoter of such concentration and for a sufficient time to charge it with the desired amount of promoter, drying the gel to thereby convert it into a hard, porous, solid material, treating the gel with a solution of a platinum compound of such concentration and for a sufficient time to impregnate it with the desired amount of platinum compound, and treating the gel to convert the platinum compound into the metal platinum. If desired, the non-dehydrated gel to be treated according to this method may be one which when dried will have a low apparent density. One way in which such non-dehydrated gel may be produced comprises subjecting a non-dehydrated gel made in any manner to heat as by immersing the gel in water at a temperature of 175° to 200° F., and allowing same to remain therein for several hours, say 4 hours. The dried gel obtained from a non-dehydrated gel which has been subjected to such heat treatment has a lower apparent density than the dried gel obtained from a non-dehydrated gel which has not been so treated.

A further method comprises treating a porous carrier with a solution of a platinum compound of such concentration and for a sufficient time to impregnate it with the desired amount of platinum compound, treating the carrier so as to convert the platinum compound into the metal platinum, and treating the impregnated carrier with a solution of a promoter substance of such concentration and for a sufficient time to charge it with the desired amount of promoter.

The treating of the carrier impregnated with a platinum compound to convert said compound into the metal platinum comprises heating the carrier to a temperature sufficient to decompose the platinum compound into the metal. Where the platinum compound is ammonium chlorplatinate, the impregnated carrier is heated to a temperature of about 360° C. If the platinum compound contained in the carrier after impregnation is platinum sulphide, the carrier is heated in a stream of air at 500° C. for about 4 hours.

Should it be desired to produce a contact mass which is extremely rigid and which is sufficiently resistant to withstand the roughest usage, a reinforcing substance is incorporated with the porous carrier at any stage during the formation of such mass. The reinforcing substance employed may be any material which possesses the inherent property of becoming plastic under suitable treatment and which when subjected to a high degree of heat as baking is changed into a non-plastic, hard, rigid solid. Clays containing a large percentage of aluminum silicate or aluminum and silica, as for example, Japanese clay, ball or fire clays, or any other clay having the inherent property of becoming plastic under suitable treatment have been found especially suitable. The aforementioned clays may be used alone or in admixture in varying amounts. Of the clays mentioned, Japanese clay is preferred. The quantity of reinforcing substance added may vary within wide limits and may be as low as 6% or less and as high as 14% or higher by weight of the finished product.

The reinforcing substance may be incorporated in the carrier material before, during, or after, the treatment of the carrier so as to impregnate it with both the promoter substance and platinum. Preferably, it is incorporated in the carrier after it has been impregnated.

To convert the mass of impregnated carrier material having a reinforcing substance disseminated therethrough into a final product which exhibits increased hardness and rigidity, it is necessary that the mass be heated to a temperature sufficient to bake it without fusing any of the constituents thereof. Heating the mass to a temperature of from 800° C. up to and not exceeding 900° C. preferably 850° C. to 875° C. is sufficient to bake it, thereby forming a satisfactory product.

Specific examples of the methods are as follows.

*Example 1*

A promoter substance in the form of a non-dehydrated hydrous oxide gel such as the non-dehydrated alumina gel is prepared by mixing together equal volumes of a solution of aluminum sulphate of about 5 to 10% strength by weight, and a normal alkali solution such as sodium or ammonium hydroxide or an organic base like ethanolamines at a temperature, preferably at 0° C. or lower, as minus 5° C. The aluminum sulphate solution may be added to the alkali solution or vice versa, or the two solutions may be flowed together simultaneously at the proper rates. Care should be taken, however, that the reaction mass is alkaline. Preferably, the mass should be agitated during mixing. The gelatinous precipitate which forms is washed by decantation to free it of excess alkali and reaction salts.

A non-dehydrated silica gel is next prepared in any of the known ways. For instance, equal volumes of solutions of sodium silicate (sp. gr. 1.1 to 1.3) and hydrochloric acid (10% solution by weight) are mixed together with agitation. According to the proportions taken and the order of mixing, a sol which coagulates after a time as a whole to a hydrogel or a gelatinous precipitate, is formed. The hydrogel or gelatinous precipitate is washed thoroughly with water to free it of acid and salt.

About 3% of the hydrous alumina gel thus prepared is mixed with about 97% of the hydrous silica gel, and the gels are triturated thoroughly by mechanical means so as to effect a thorough mixture.

A carrier containing the mixture of non-dehydrated silica and alumina gels is treated with a solution of a platinum compound such as ammonium chlorplatinate as by immersing the gel in a solution of such compound, and allowing it to remain therein for a sufficient time to charge it to the desired degree. The concentration of the ammonium chlorplatinate solution may be of about 0.5% or less. The carrier is allowed to remain in the platinate solution for about 12 to 24 hours, whereupon the solution is separated from the impregnated gel by decantation.

The impregnated gel is then dried or it may be formed into small granules, as by extrusion, and then dried in any suitable manner. The drying may be effected by passing air at a temperature of, say 150° to 200° C., over the gel. The drying converts the mixture of silica and alumina gels into a hard, porous material.

The impregnated carrier is then heated to a temperature of about 360° C. thereby decomposing the ammonium chlorplatinate into finely divided platinum which is deposited in the pores and on the surfaces of the gel.

The product thus obtained comprises granules containing silica gel having alumina associated therewith, and having platinum in a finely divided state distributed in the pores and on the surfaces of the granules.

*Example 2*

To the reaction mass obtained by mixing equal volumes of solutions of sodium silicate and hydrochloric acid together with agitation as described in Example 1 is added a promoter substance such as chromium chloride in an amount such that the final product will contain about 2% by weight of chromium oxide. The chromium salt may be added in the solid form or in the form of a diluted solution. The silica jelly and/or precipitate which is formed is then washed thoroughly with water to free it of salt and acid.

A carrier containing the silica jelly and/or precipitate having chromium oxide associated therewith is then treated with a solution of a platinum compound such as ammonium chlorplatinate in the same manner as described in Example 1. The impregnated gel is then dried and treated so as to convert the platinum compound into the metal platinum in the same manner as described in Example 1.

The product thus obtained comprises granules containing silica gel having platinum in a finely divided state and chromium oxide distributed in the pores and on the surfaces of the granules.

*Example 3*

A carrier containing a non-dehydrated hydrous oxide gel such as a non-dehydrated silica gel, preferably washed, is treated with a solution of a promoter substance, as for example, manganese sulphate, as by immersing the gel in said solution and allowing it to remain therein for a sufficient time to effect the required impregnation. The manganese sulphate solution is of about 2 to 5% strength by weight. Soaking for several hours, say about 12 to 24 hours, is sufficient. The spent manganese sulphate solution is then separated from the impregnated gel in any well known manner, as by draining.

The carrier containing the non-dehydrated silica gel impregnated with manganese sulphate is next immersed in a solution of ammonium chlorplatinate, and allowed to remain therein for a sufficient time to charge the carrier with the desired amount of platinum compound. The concentration of the ammonium chlorplatinate may be of about 0.5% or less. The carrier is allowed to remain in the platinum solution for about 12 to 24 hours, whereupon the solution is separated from the impregnated gel by decantation.

The carrier containing the impregnated non-dehydrated silica gel is dried, and then heated so as to convert the ammonium chlorplatinate into platinum in the same manner as described in Example 1.

The product thus obtained comprises granules containing silica gel having platinum in a finely divided state and manganese sulphate deposited in the pores and on the surfaces of the granules.

*Example 4*

A carrier containing a non-dehydrated hydrous oxide gel such as the non-dehydrated silica gel, is treated with a solution containing both manganese sulphate and ammonium chlorplatinate in place of successively treating the carrier with a manganese sulphate solution, and a solution of an ammonium chlorplatinate as in Example 1. The spent solution is separated from the impregnated gel by decantation whereupon the gel is dried and then treated so as to convert the platinum compound into the metal platinum in the same manner as described in Example 1.

The product thus obtained also comprises granules containing silica gel having platinum in a finely divided state and manganese sulphate distributed in the pores and on the surfaces thereof.

*Example 5*

A carrier containing a non-dehydrated silica gel is impregnated with a promoter substance and ammonium chlorplatinate in the same manner as described in Example 3 but in place of manganese sulphate, aluminum sulphate is used. The thus impregnated carrier is mixed with a quantity of clay such as Japanese clay which will give a product when dried containing about 8% clay or less. The mixture is ground together in any suitable manner producing a pasty mass of homogeneous consistency. The mass is then extruded through a coarse sieve or a perforated plate, and dried in any suitable manner, as for example by passing air at a temperature of say 150° to 200° C., over the gel. The dried product may be broken into pieces of any desired size. The dried product is next heated to a temperature of 875° C. for about 30 minutes or longer to bake same.

The product thus obtained comprises granules containing silica gel and clay integrally bound together, having platinum in a finely divided state distributed in the pores and on the surfaces of the granules together with alumina intimately disseminated throughout the granules.

*Example 6*

A carrier containing a non-dehydrated silica gel, preferably after being thoroughly washed, is treated with a solution of manganese sulphate, as by immersing the gel in said solution and allowing it to remain therein for a sufficient time to effect the required impregnation. The concentration of the manganese sulphate solution is about 2 to 5% by weight. Soaking for a number of hours, say about 12 to 24 hours is sufficient. The manganese sulphate solution is then separated from the impregnated gel in any well known manner as by draining.

The carrier containing the non-dehydrated silica gel impregnated with manganese sulphate is then dried in any suitable manner, as for example by passing air at a temperature of, say 150° to 200° C. over the gel. The drying converts the gel into a hard, porous material.

The carrier containing the dried silica gel impregnated with manganese sulphate is next immersed in a solution of ammonium chlorplatinate and allowed to remain therein for a sufficient time to charge the gel with the desired amount of platinum compound. The concentration of the ammonium chlorplatinate may be about 0.5% or less by weight. The gel is allowed to remain in the platinate solution for about 12 to 24 hours, whereupon the solution is separated from the impregnated gel by decantation.

The carrier containing the dried silica gel impregnated with both manganese sulphate and ammonium chlorplatinate is then placed in a closed vessel. A reacting gas such as hydrogen sulphide is introduced into the vessel in an amount sufficient to react with the ammonium chlorplatinate compound to convert it into platinum sulphide. Within about 15 minutes the reaction is complete.

The platinum sulphide deposited in and about the pores of the gel is converted into metallic platinum by heating the gel in a stream of air at 500° C. for about 4 hours.

The product thus obtained consists of granules containing silica gel having platinum in a finely divided state and manganese sulphate distributed in the pores and on the surfaces of the granules.

*Example 7*

A non-dehydrated gel of tungstia is prepared by gradually adding a solution of an acid, such as hydrochloric or sulphuric acid, to a solution of sodium tungstate of about 3 to 8% strength with stirring. The total amount of acid used is such as to give a final acidity of the reaction mass equal to about 0.1 N. to 0.5 N. acid. With this acidity the reaction mass or sol will coagulate or set to a hydrogel in a few minutes, say 4 to 30 minutes, at room temperature. The hydrogel which forms is rather soft, and must be washed carefully. It is then broken into pieces and then washed free of reaction salts.

A carrier including the non-dehydrated gel of tungstia is treated according to the process described in Example 3.

The product thus obtained comprises granules containing tungstia gel having platinum in a finely divided state and manganese dioxide distributed in the pores and on the surfaces of the granules.

*Example 8*

A non-dehydrated gel containing the oxides of tin and tungsten is prepared by forming a mixture of a stannic salt solution and a tungstate solution as by mixing 50 cc. of an 8% sodium tungstate solution and 100 cc. of a 10% stannic chloride solution together. To this mixture is then added gradually 20 cc. of a 10% ammonium hydroxide solution with agitation. It is also possible to add the ammonium hydroxide to the sodium tungstate solution, and then add such mixture to the stannic chloride solution with agitation. The resulting mixture in each case is slightly acid. The reaction mixture sets after a time, to a hydrogel or jelly which is washed thoroughly with water to free it of reaction salts.

A carrier including the plural non-dehydrated gel of tungstia and stannia is dried in any suitable manner, as for example by passing air at a temperature of, say 150° to 200° C., over the gel. The drying converts the gel into a hard, porous material.

The carrier containing the dried plural gel of tungstia and stannia is immersed in a solution of ammonium chlorplatinate and allowed to remain therein for a sufficient time to charge the gel with the desired amount of platinum compound. The concentration of the ammonium chlorplatinate may be about 0.5% or less, by weight. The gel is allowed to remain in the platinate solution for about 12 to 24 hours, whereupon the solution is separated from the impregnated gel by decantation.

The impregnated carrier is then heated to a temperature of about 360° C. thereby decomposing the ammonium chlorplatinate into finely divided platinum which is deposited in the pores and on the surfaces of the gel.

The platinum impregnated gel of tungstia and stannia is next treated with a solution of vanadyl sulphate of about 1% strength by weight. This is done by spraying the solution upon the gel granules. The gel is then heated under oxidizing conditions to convert the vanadyl sulphate to vanadium oxide.

The product thus obtained consists of granules of the plural gel of tungstia and stannia having platinum in a finely divided state and vanadium pentoxide distributed in the pores and on the surfaces of the granules.

*Example 9*

A non-dehydrated gel of titania is prepared by bringing together with agitation an acid solution of sodium titanate and a solution of an alkali such as sodium hydroxide. The sodium titanate solution is about 4 N. acid. Such solution may be obtained by fusing titanium oxide with sodium hydroxide and recovering the sodium titanate from the fused mass, in the form of an acid solution of sodium titanate. The sodium hydroxide solution is mixed with the titanate solution until the acidity of the reaction mass is approximately 0.01 N. or less, preferably between 0.02 N. and 0.002 N. This is best noted by the use of brom-phenol-blue as an indicator. A flocculent precipitate forms which is washed by decantation until free of reaction salts.

The non-dehydrated gel of titania thus formed is subjected to a treatment as by immersing the gel in water at a temperature of 175° to 200° F. and allowing it to remain therein for several hours, say 4 hours. This treatment gives a final product having a low apparent density. The gel is then dried in any suitable manner as for example, by passing air at a temperature of about 150° to 200° C. over it, thereby converting the gel into a hard, porous material having a low apparent density.

A carrier containing the dried titania gel of low apparent density is treated with a solution containing about 1% by weight of aluminum chloride and about 0.5% by weight of ammonium chlorplatinate as by soaking the gel in said solution for a number of hours, say 12 to 24 hours. The solution is then separated from the impregnated gel as by draining.

The carrier containing the impregnated dehydrated gel is then heated to a temperature of about 360° C. to thereby decompose the ammonium chlorplatinate into finely divided platinum which is deposited in the pores and on the surfaces of the gel.

The product thus obtained comprises granules containing low density tungstia gel having platinum in a finely divided state and alumina deposited in the pores and on the surfaces of the granules.

Example 10

A carrier containing nearly dehydrated silica gel is subjected to a heat treatment to free the gel of adsorbed gases, such as air. This is accomplished by placing the gel in a closed container provided with a jacket and circulating a hot fluid therethrough.

The container is then cooled to about 30° C., whereupon a reacting gas such as hydrogen sulphide gas is introduced into the container in an amount sufficient to fully charge the pores of the gel.

A solution containing about 0.3% of platinic chloride and about 2% of copper sulphate is then introduced into the container. The gel and solution are preferably agitated during the mixing. Upon contact of the solution with the gel the gel turns black almost instantly, and platinum sulphide and copper sulphide are precipitated in and about the pores of the gel. Within a few minutes, say about 10 minutes, the reaction is complete, and the gel particles are practically dry to the touch.

Although the gel particles are sensibly dry, they still contain moisture which is held within their pores. In order to reduce and practically free the gel particles of this moisture they are heated in a current of air at a temperature of 105° C. for about 8 hours.

The platinum sulphide and copper sulphide deposited in and about the pores of the gel are converted into metallic platinum and copper oxide by heating the gel in a stream of air at 500° C. for about 4 hours.

The product thus obtained consists of granules containing silica gel having platinum in a finely divided state and copper oxide distributed in the pores and on the surfaces of the granules.

Example 11

A carrier including gel fines of any kind, preferably of silica, is placed in a receptacle. A beryllium sulphate solution is then introduced into the receptacle in an amount sufficient to cover the gel fines. The concentration of the beryllium sulphate solution is about 2% by weight. The gel fines are allowed to soak in the beryllium sulphate solution for about 12 to 24 hours whereupon the solution is separated therefrom as by draining.

A solution of ammonium chlorplatinate is then introduced into the container in an amount sufficient to cover the gel fines. The concentration of the platinate solution is about 0.5% strength. Allowing the gel fines to remain in contact with the platinate solution for about 12 to 24 hours is sufficient to complete the impregnation. The solution is then withdrawn from the container.

The impregnated gel fines are then heated to a temperature of about 360° C. thereby decomposing the ammonium platinate into finely divided platinum which is deposited in the pores and on the surfaces of the gel.

The product thus obtained comprises silica gel fines having platinum in a finely divided state, and beryllium oxide distributed in the pores and on the surfaces of the granules.

Example 12

A carrier containing a nearly dehydrated base-exchange compound such as glauconite is treated according to the process described in Example 11.

The product thus obtained comprises glauconite having platinum in a finely divided state and beryllium oxide distributed in the pores and on the surfaces thereof.

Various specified details of procedure and conditions of operation have been set forth above for the purpose of giving a clear understanding of the process, but the invention is not limited to the exact details given, as it includes modifications and changes coming within the scope of the appended claims.

Having thus described the invention, what is claimed as new and desired to be secured by Letters Patent is:

1. A contact mass comprising a porous adsorbent carrier including a reinforcing substance and a dried gel, and having platinum and a compound of a metal acting as a promoter for the platinum associated therewith.

2. The product according to claim 1 wherein the compound of a metal is a compound of aluminum.

3. The product according to claim 1 wherein the compound of a metal is a compound of manganese.

4. The method of making a platinum contact mass consisting in incorporating a platinum compound in a porous adsorbent carrier including a gel and a reinforcing substance, treating the carrier to convert the platinum compound into the metal platinum, and introducing a promoter substance in said carrier at some stage of the manufacture of said mass.

5. The method of making a platinum contact mass consisting in incorporating a promoter substance and a platinum compound in a carrier including a non-dehydrated hydrous oxide gel, introducing a reinforcing substance in said carrier, drying the carrier to convert the non-dehydrated gel into a hard porous material, and treating the dried carrier to convert the platinum compound into the metal platinum.

6. The method of making a platinum contact mass consisting in incorporating a promoter substance in a carrier including a non-dehydrated hydrous oxide gel, impregnating the carrier with a platinum compound, introducing a reinforcing substance in said carrier, drying the carrier to convert the non-dehydrated gel into a hard porous material, and baking the carrier to convert it into a hard rigid product and convert the platinum compound into the metal platinum.

7. The contact process for the manufacture of sulphuric acid which includes passing a gas mixture containing sulphur dioxide and oxygen over a contact mass, said contact mass comprising a porous adsorbent carrier impregnated with platinum and having a promoter for the platinum associated therewith, said promoter being chosen from the group of substances consisting of a compound of the metals iron, nickel, aluminum, copper, bismuth, molybdenum, beryllium, vanadium, tin, chromium, and manganese, and being present in an appreciable amount up to and not exceeding 5% by weight of said contact mass.

8. The contact process for the manufacture of sulphuric acid which includes passing a gas mixture containing sulphur dioxide and oxygen over a contact mass, said contact mass comprising a porous adsorbent carrier including a dried gel impregnated with platinum and having a promoter for the platinum associated therewith, said promoter being chosen from the group of substances consisting of a compound of the metals iron, nickel, aluminum, copper, bismuth, molybdenum, beryllium, vanadium, tin, chromium, and manganese, and being present in an appreciable amount up to and not exceeding 5% by weight of said contact mass.

9. The contact process for the manufacture of sulphuric acid which includes passing a gas mixture containing sulphur dioxide and oxygen over a contact mass, said contact mass comprising a porous adsorbent carrier including a dried gel impregnated with platinum and a compound of manganese, said compound of manganese being present in an appreciable amount up to and not exceeding 5% by weight of said mass.

10. A contact mass comprising a porous adsorbent carrier including a reinforcing substance and impregnated with platinum and a promoter substance for the platinum.

GERALD C. CONNOLLY
JEREMIAH A. PIERCE.